United States Patent
Ryu

(10) Patent No.: US 9,527,443 B2
(45) Date of Patent: Dec. 27, 2016

(54) AROUND VIEW MONITORING SYSTEM AND OPERATING METHOD THEREOF

(71) Applicant: HYUNDAI MOBIS Co., Ltd., Yongin-si, Gyeonggi-do (KR)

(72) Inventor: Hyun Su Ryu, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 227 days.

(21) Appl. No.: 14/493,427

(22) Filed: Sep. 23, 2014

(65) Prior Publication Data

US 2015/0092047 A1    Apr. 2, 2015

(30) Foreign Application Priority Data

Sep. 30, 2013  (KR) .................. 10-2013-0116278
Sep. 5, 2014   (KR) .................. 10-2014-0118569

(51) Int. Cl.
| B60R 1/00  | (2006.01) |
| H04N 7/18  | (2006.01) |
| G06K 9/00  | (2006.01) |
| B60Q 11/00 | (2006.01) |

(52) U.S. Cl.
CPC .............. *B60R 1/00* (2013.01); *B60Q 11/005* (2013.01); *G06K 9/00825* (2013.01); *H04N 7/181* (2013.01); *B60R 2300/105* (2013.01); *B60R 2300/30* (2013.01)

(58) Field of Classification Search
CPC .. B60R 1/00; B60R 2300/30; B60R 2300/105; B60Q 11/005; H04N 7/181; G06K 9/00825
See application file for complete search history.

(56) References Cited

U.S. PATENT DOCUMENTS

2013/0128599 A1*  5/2013  Park .................. B60Q 1/08
                                                 362/466

\* cited by examiner

*Primary Examiner* — Chikaodili E Anyikire
*Assistant Examiner* — Nam Pham
(74) *Attorney, Agent, or Firm* — Paratus Law Group, PLLC

(57) ABSTRACT

The present invention provides an AVM system, including: a display module; a camera module which captures surrounding videos of a vehicle; and a control module which calculates an illumination brightness corresponding to an illumination region of a head lamp which is mounted in the vehicle and a shadow brightness corresponding to a shadow region in an AVM video obtained by composing the surrounding videos, generates state information of the head lamp based on the illumination brightness and the shadow brightness, and controls the display module to display the AVM video and the state information.

5 Claims, 5 Drawing Sheets

AROUND VIEW MONITORING SYSTEM AND OPERATING METHOD THEREOF

CROSS-REFERENCE TO RELATED APPLICATIONS

The present application claims priority to Korean Patent Application Number 10-2013-0116278 filed Sep. 30, 2013 and 10-2014-0118569 filed Sep. 5, 2014, the entire contents of which application is incorporated herein for all purposes by this reference.

TECHNICAL FIELD

The present invention relates to an around view monitoring (AVM) system and an operating method thereof, and more particularly to an AVM system which displays state information regarding whether a head lamp normally operates, on a display module, and an operating method thereof.

BACKGROUND

Generally, illumination equipment, such as a tail light or a head lamp which guides a driver to safely drive by displaying an interval between front and rear vehicles while driving in a dark place or at night and secures a clear view for the driver by providing forward illumination and a fog lamp which allows the driver to easily distinguish his/her own vehicle when it is foggy, is mounted in a vehicle.

Recently, an AVM system which displays a top view or around view video to a driver using cameras which are mounted at front, rear, left, and right sides of the vehicle is mounted in the vehicle.

The AVM system displays a front side video while the vehicle is forwardly driven and displays a rear side video together with an around view video while the vehicle is backwardly driven. However, the front side video or the rear side video is a video obtained by erasing a part of a left region and a part of a right region of the captured video.

Recently, studies are being performed in order to allow a driver to check whether a head lamp normally operates or erroneously operates through an AVM video using the AVM system while the head lamp is turned on.

SUMMARY

The present invention has been made in an effort to provide an AVM system which displays status information regarding whether a head lamp normally operates, on a display module to allow a driver to check whether the head lamp normally operates or erroneously operates and an operating method thereof.

A first exemplary embodiment of the present invention provides an AVM system, including: a display module; a camera module which captures surrounding videos of a vehicle; and a control module which calculates an illumination brightness corresponding to an illumination region of a head lamp which is mounted in the vehicle and a shadow brightness corresponding to a shadow region in an AVM video obtained by composing the surrounding videos, generates state information of the head lamp based on the illumination brightness and the shadow brightness, and controls the display module to display the AVM video and the state information.

A second exemplary embodiment of the present invention provides an AVM system, including: a display module; a camera module which captures surrounding videos of a vehicle; and a lamp driving module which supplies or shuts off a driving power to first and second head lamps which are mounted in the vehicle to turn on or off the first and second head lamps; and a control module which calculates a first illumination brightness corresponding to a first illumination region of the first head lamp and a first shadow brightness corresponding to a first shadow region, in an AVM video obtained by composing the surrounding videos and a second illumination brightness corresponding to a second illumination region of the second head lamp and a second shadow brightness corresponding to a second shadow region, generates first state information of the first head lamp and second state information of the second head lamp based on the first and second illumination brightnesses and the first and second shadow brightnesses, and controls the display module to display the AVM video and the first and second state information.

An exemplary embodiment of the present invention provides an operating method of an AVM system, including: capturing, by a camera module, surrounding videos of a vehicle; calculating an illumination brightness corresponding to an illumination region of a head lamp which is mounted in the vehicle and a shadow brightness corresponding to a shadow region in an AVM video obtained by composing the surrounding videos; comparing whether the shadow brightness is larger than a set reference brightness; determining, when the shadow brightness is smaller than the reference brightness, whether a brightness difference between the illumination brightness and the shadow brightness falls into a set reference brightness difference range; and generating state information of the head lamp indicating that the head lamp normally operates when the brightness difference falls into the reference brightness difference range to display the AVM video and the state information on a display module.

According to the AVM system and the operation method thereof according to the present invention, when the head lamp is turned on, that is, the head lamp performs an on-operation, based on the illumination brightness and the shadow brightness corresponding to a region set in the AVM video obtained by composing the surrounding videos of the vehicle, that is, the illumination region and the shadow region of the head lamp, state information of the head lamp indicating that the head lamp normally operates or erroneously operates is displayed on the display module which displays the AVM video so that the driver may check whether the head lamp is normal or erroneous while being seated on a driver seat.

DETAILED DESCRIPTION OF THE INVENTION

Figure 1:
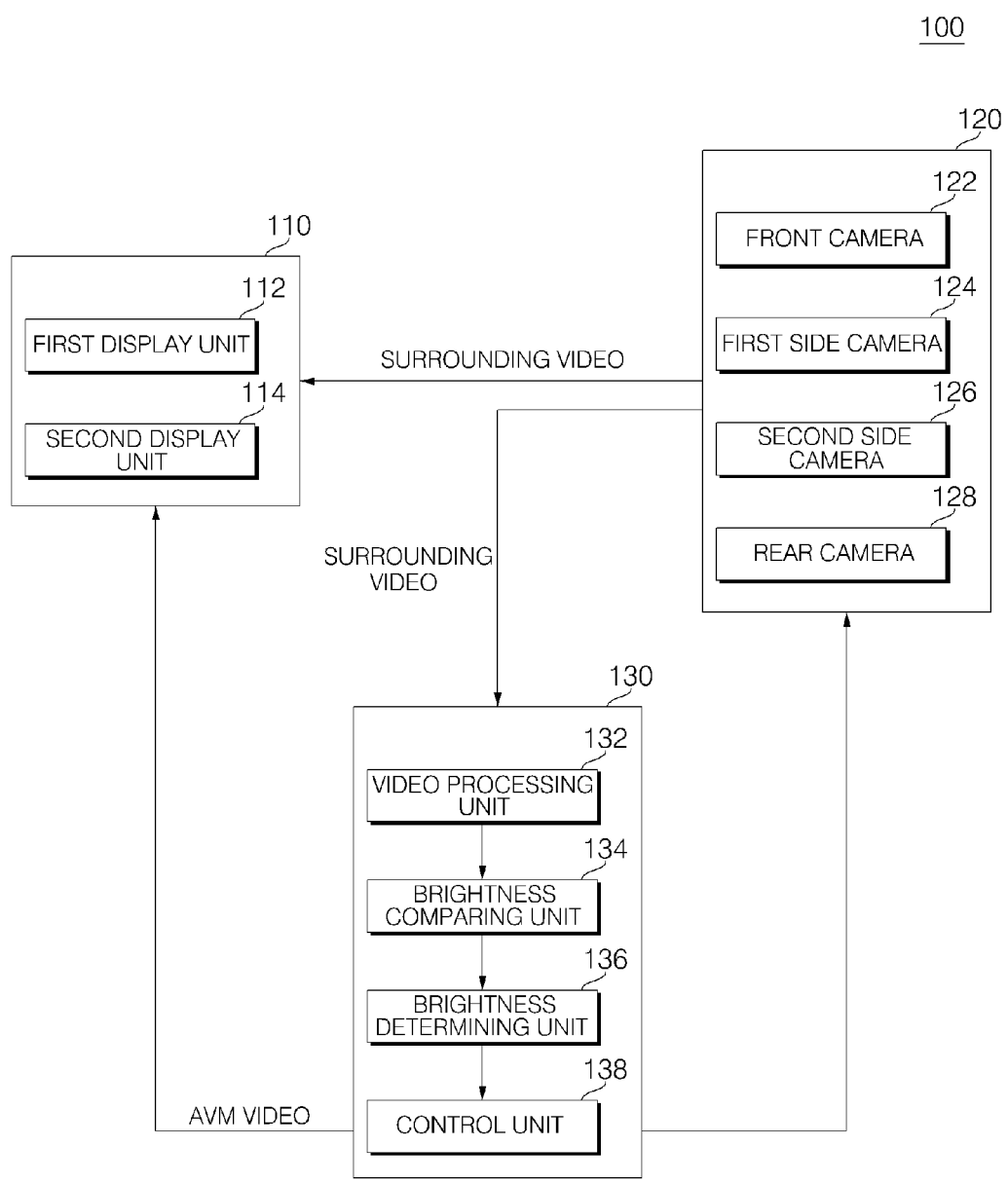
FIG. 1 is a control block diagram illustrating a control configuration of an AVM system according to a first exemplary embodiment of the present invention.

Advantages and characteristics of the present invention, and a method of achieving the advantages and characteristics will be clear by referring to exemplary embodiments described below in detail together with the accompanying drawings. However, the present invention is not limited to exemplary embodiments disclosed herein but will be implemented in various forms. The exemplary embodiments introduced herein are provided to make disclosed contents thorough and complete and sufficiently transfer the spirit of the present invention to those skilled in the art. Therefore, the present invention will be defined only by the appended claims. Like reference numerals indicate like elements throughout the specification.

Unless otherwise defined, all terms (including technical and scientific terms) used in the present specification may be used as the meaning which may be commonly understood by a person with ordinary skill in the art, to which the present invention pertains. It will be further understood that terms defined in commonly used dictionaries should not be interpreted to have an idealistic or excessively formalistic meaning unless expressly and specifically defined.

Hereinafter, exemplary embodiments will be described in more detail with reference to drawings.

FIG. 1 is a control block diagram illustrating a control configuration of an AVM system according to a first exemplary embodiment of the present invention.

Referring to FIG. 1, an AVM system 100 may include a display module 110, a camera module 120, and a control module 130.

The display module 110 may display an AVM video which is transmitted from the control module 130 and a surrounding video of the vehicle which is captured by the camera module 120.

The display module 110 enables touch input and may display an input menu through which a display command is input.

In the exemplary embodiment, even though it is described that the input menu is input on the display module 110 by touching the display module 110, a display command may be input by applying physical force such as a button and the present invention is not limited thereto.

The display module 110 may include a first display unit 112 which displays the surrounding video and a second display unit 114 which displays the AVM video, but the present invention is not limited thereto.

In the exemplary embodiment, even though it is described that the display module 110 displays the surrounding video and the AVM video on the first and second display units 112 and 114 which are different from each other, the surrounding video and the AVM video may be displayed in different regions of one display unit and the present invention is not limited thereto.

The display module 110 will be described below in detail with reference FIG. 2.

The camera module 120 may include a front camera 122, first and second side cameras 124 and 126, and a rear camera 128.

In an exemplary embodiment, when a gear of the vehicle is positioned at an "R" step or a speed of the vehicle is lowered to a setting speed, the camera module 120 automatically captures a surrounding video of the vehicle or operates in response to the control of the control module 130 to capture the surrounding video of the vehicle, but the present invention is not limited thereto.

The front camera 122 may capture a front side video of the vehicle among the surrounding videos and the first and second side cameras 124 and 126 capture first and second side videos of the vehicle among the surrounding videos.

In this case, the first and second side cameras 124 and 126 may capture a left side and a right side of the vehicle.

The rear camera 128 may capture a rear side video of the vehicle, among the surrounding videos.

In the exemplary embodiment, even though it has been described that the camera module 120 includes four cameras 122, 124, 126, and 128, the number of cameras is not limited thereto.

In the exemplary embodiment, even though it has been described and illustrated in the drawing that the four cameras 122, 124, 126, and 128 transmit the captured front side video, first and second side videos, and rear side video to the control module 130, a camera control unit (not illustrated) which combines the front side video, the first and second side videos, and the rear side video which are captured by the four cameras 122, 124, 126, and 128 to generate a surrounding video and transmit the surrounding video to the control module 130 may be provided and the present invention is not limited thereto.

The control module 130 may include a video processing unit 132, a brightness comparing unit 134, a brightness determining unit 136, and a control unit 138.

The video processing unit 132 composes the front side video, the first and second side videos, and the rear side video which are input from the camera module 120 in accordance with a set video composite condition to form the AVM video and calculates an illumination brightness corresponding to a pixel which is included in an illumination region and a shadow brightness corresponding to a pixel included in a shadow region, in the AVM video.

That is, the pixel may have Y, Cr, and Cb values in order to express the video and the Y value is a brightness and may have a value between 0 and 255.

The video processing unit 132 may calculate the illumination brightness and the shadow brightness based on the Y value corresponding to at least one pixel which is included in the illumination region and the shadow region of a head lamp (not illustrated) which is mounted in the vehicle, in the AVM video.

The above-mentioned illumination region and shadow region may correspond to predetermined regions in the AVM video or may be distinguished as videos whose brightness is different from that of a background video, but the present invention is not limited thereto.

Accordingly, the video processing unit 132 calculates the illumination brightness based on the brightness of the pixel included in the illumination region and the shadow brightness based on the brightness of the pixel included in the shadow region.

The brightness comparing unit 134 compares the shadow brightness calculated in the video processing unit 132 with a set reference brightness.

That is, the brightness comparing unit 134 may output a first signal when the shadow brightness is smaller than the reference brightness and output a second signal when the shadow brightness is larger than the reference brightness.

The reference brightness is a brightness which is set to check whether the vehicle is located in a bright place or a dark place.

For example, it is known from a general experiment that when the head lamp is turned on, the illumination brightness has a value of approximately 150 to 160 and the shadow brightness has a value of approximately 10 to 20.

As described above, the reference brightness may be a value which is used to check whether the shadow brightness is a valuable value in order to check whether a turned-on state of the head lamp is maintained and may be a brightness which is set corresponding to an external brightness to distinguish the illumination brightness and the shadow brightness.

The brightness determining unit 136 may calculate a brightness difference between the illumination brightness and the shadow brightness when the first signal is input from the brightness comparing unit 134 and determine whether the brightness difference is within a set reference brightness difference range.

As described above, it is understood that when the head lamp is turned on, the brightness difference between the illumination brightness and the shadow brightness may be 130 to 150.

Therefore, the reference brightness difference range may be 130 to 150 and is not limited thereto.

When the brightness difference falls into the brightness difference range, the control unit 138 generates state information of the head lamp indicating that the head lamp normally operates and when the brightness difference does not fall into the brightness difference range, generates state information of the head lamp indicating that the head lamp erroneously operates and controls the display module 110 to display the state information.

When the second signal is input from the brightness comparing unit 134, the control unit 138 controls the display module 110 to display movement information indicating that the vehicle moves.

That is, when the second signal is input, the control unit 138 determines that the vehicle is located in the bright place. Therefore, when the head lamp is in an on-state, the control unit 138 cannot check whether the head lamp normally operates so that the control unit 138 generates the movement information which requests the vehicle to move to the dark place and transmits the movement information to the display module 110.

Figure 2:
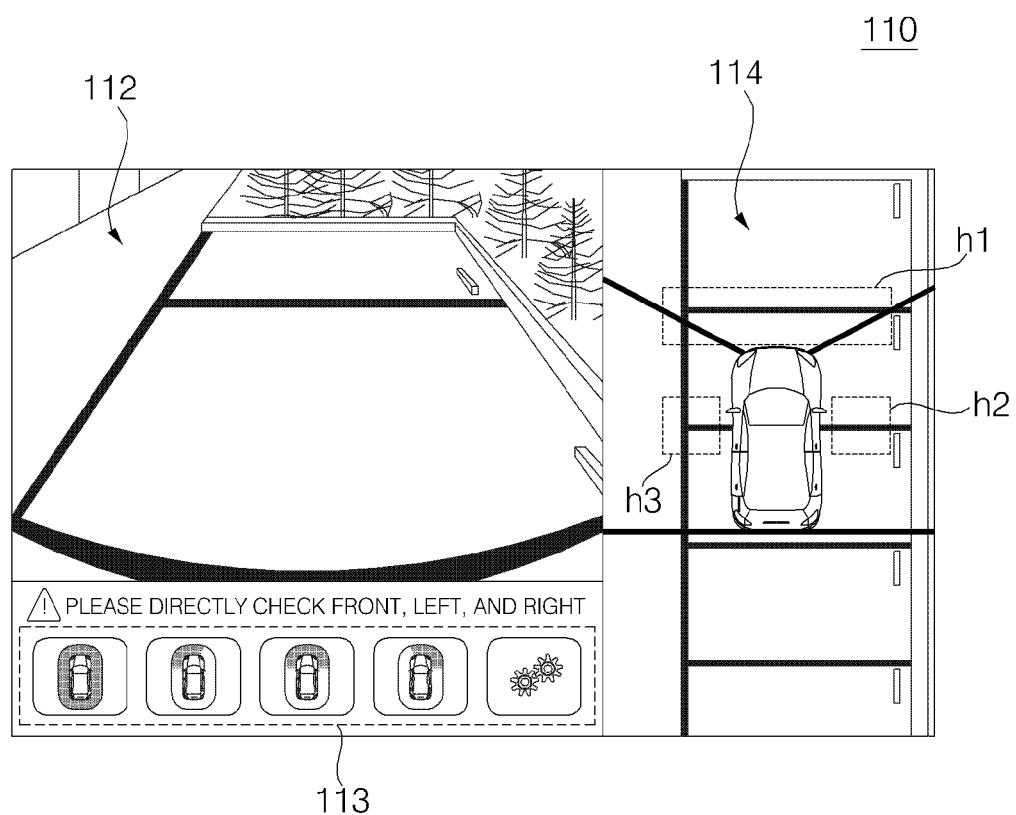
FIG. 2 is a view illustrating an example of an AVM video which is displayed on a display module illustrated in FIG. 1.

FIG. 2 is a view illustrating an example of an AVM video which is displayed on a display module illustrated in FIG. 1.

FIG. 2 is an example explaining the display module 110 and the present invention is not limited thereto.

Referring to FIG. 2, the display module 110 may include a first display unit 112 and a second display unit 114 as illustrated in FIG. 1.

In this case, an input menu 113 through which a display command to display any one of the front side video, the first and second side videos, and the rear side video which are captured by the camera module 120 is input may be displayed on the first display unit 112.

An AVM video which is obtained by erasing at least a part of the front side video, the first and second side videos, and the rear side video and composing the other parts may be displayed on the second display unit 114.

In this case, the second display unit 114 may include a front side of the vehicle, that is an illumination region h1 where the head lamp (not illustrated) illuminates and first and second sides of the vehicle, that is, shadow regions h2 and h3 which are not influenced by the state when the head lamp is turned on.

Here, even though the shadow regions h2 and h3 are described to be set at the first and second sides of the vehicle, in order to check whether the head lamp normally operates, only one shadow region which is set in any one side of the first and second sides may be used, and the present invention is not limited thereto.

Figure 3:
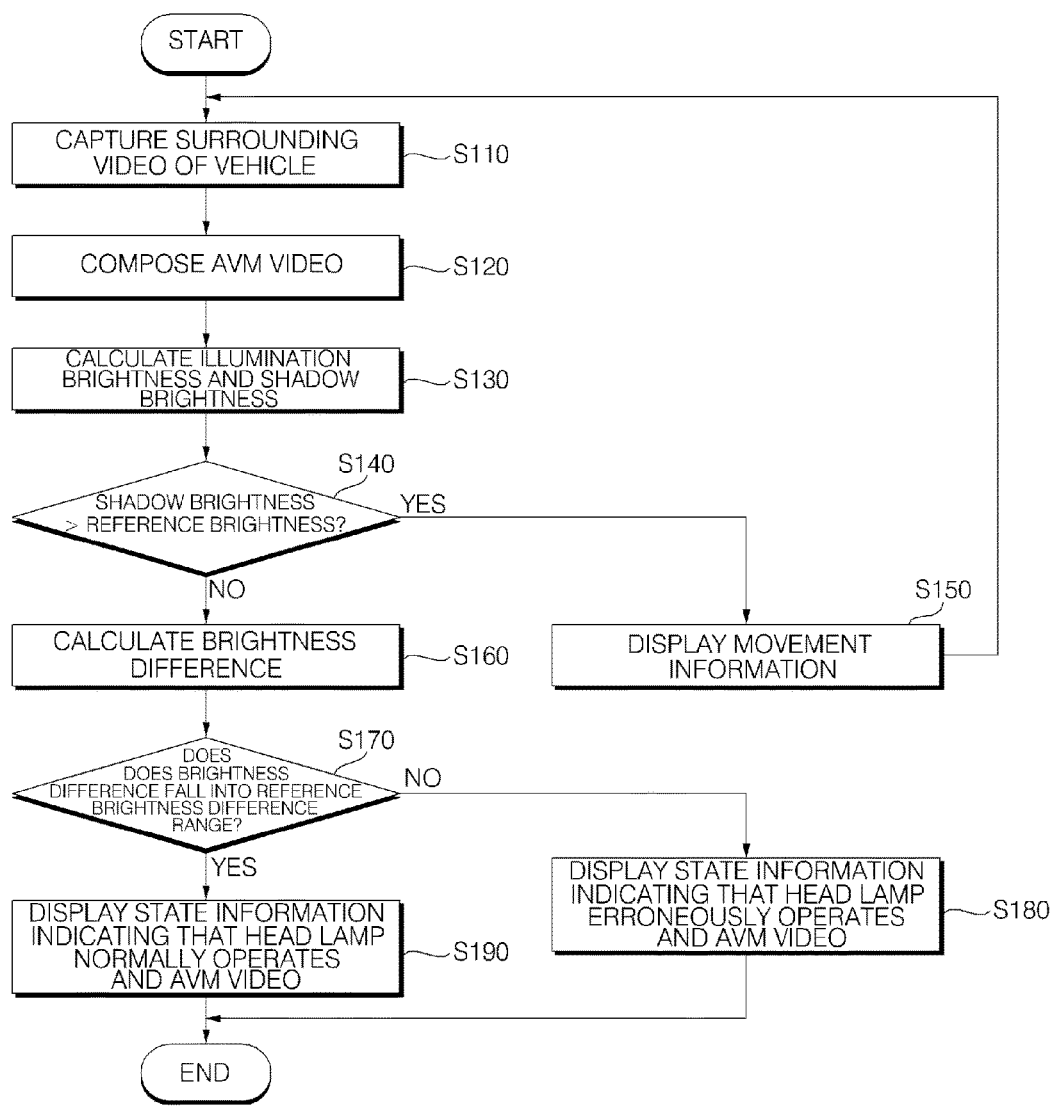
FIG. 3 is a flowchart illustrating an operating method of an AVM system according to a first exemplary embodiment of the present invention.

FIG. 3 is a flowchart illustrating an operating method of an AVM system according to a first exemplary embodiment of the present invention.

Referring to FIG. 3, the control module 130 of the AVM system 100 operates the camera module 120 to capture surrounding videos of the vehicle, that is, the front side video, the first and second side videos, and the rear side video in step S110.

Next, the control module 130 composes the front side video, the first and second side videos, and the rear side video which are captured by the camera module 120 in accordance with a set video composite condition to form the AVM video in step S120 and calculates the illumination brightness corresponding to the illumination region of the head lamp which is mounted in the vehicle and the shadow brightness corresponding to the shadow region, in the AVM video in step S130.

The control module 130 compares whether the shadow brightness is larger than the set reference brightness in step S140 and when the shadow brightness is larger than the reference brightness, controls the display module 110 to display the movement information indicating that the vehicle moves in step S150.

When the shadow brightness is smaller than the reference brightness, the control module 130 calculates a brightness difference between the illumination brightness and the shadow brightness in step S160 and determines whether the brightness difference falls into a set reference brightness difference range in step S170.

When the brightness difference does not fall into the reference brightness difference range, the control module 130 generates state information of the head lamp indicating that the head lamp erroneously operates to display the AVM video and the state information on the display module 110 in step S180 and when the brightness difference falls into the reference brightness difference range, the control module 130 generates state information of the head lamp indicating that the head lamp normally operates to display the AVM video and the state information on the display module 110 in step S190.

Figure 4:
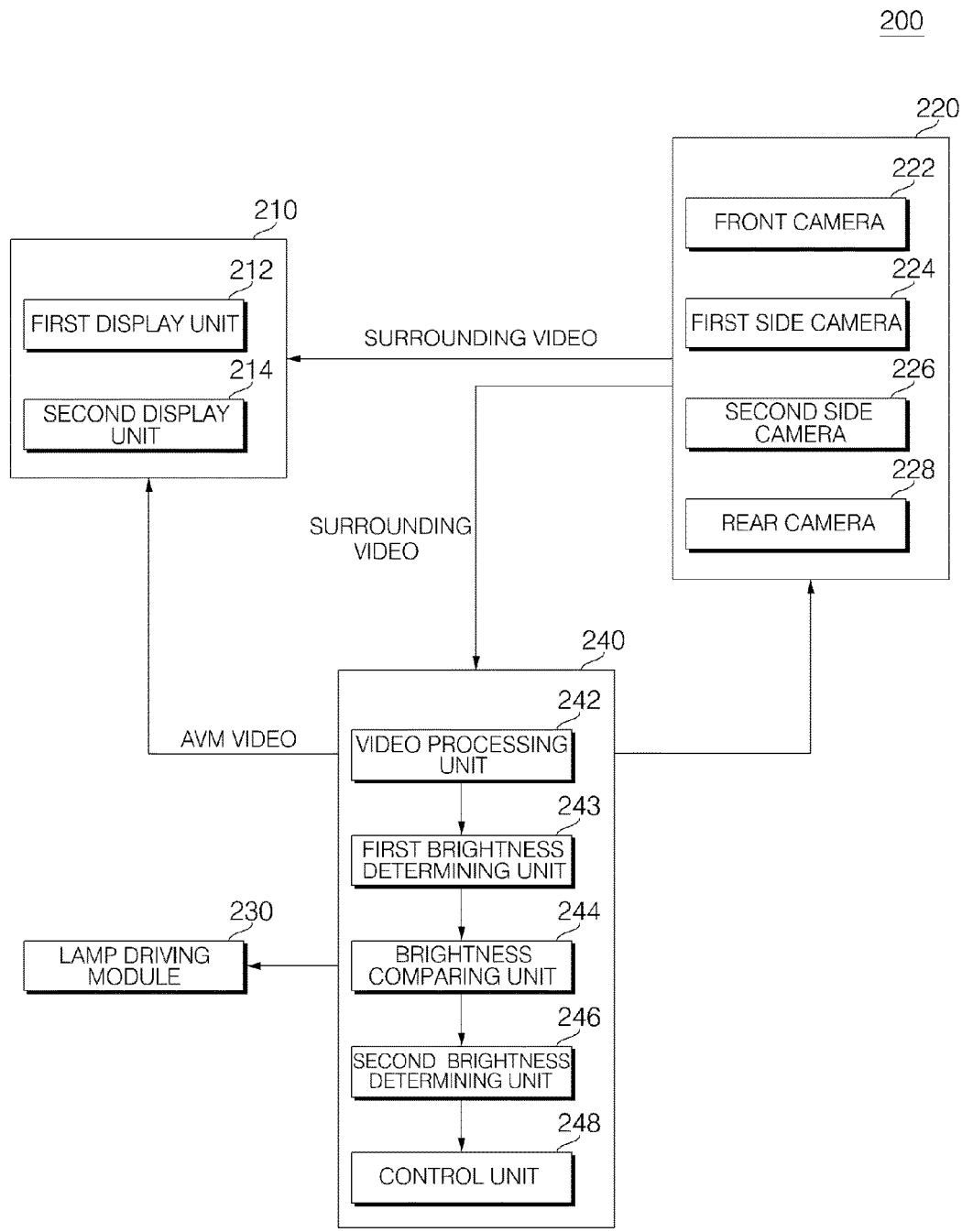
FIG. 4 is a control block diagram illustrating a control configuration of an AVM system according to a second exemplary embodiment of the present invention.

FIG. 4 is a control block diagram illustrating a control configuration of an AVM system according to a second exemplary embodiment of the present invention.

Referring to FIG. 4, an AVM system 200 may include a display module 210, a camera module 220, a lamp driving module 230, and a control module 240.

The display module 210 may display an AVM video which is transmitted from the control module 240 and surrounding videos of the vehicle which is captured by the camera module 220.

The display module 210 enables touch input and may displays an input menu through which a display command is input.

In the exemplary embodiment, even though it is described that the input menu is input on the display module 210 by touching the display module 210, a display command may be input by applying physical force such as a button and the present invention is not limited thereto.

The display module 210 may include a first display unit 212 which displays the surrounding videos and a second display unit 214 which displays the AVM video but is not limited thereto.

In the exemplary embodiment, even though it is described that the display module 210 displays the surrounding video and the AVM video on the first and second display units 212 and 214 which are different from each other, the surrounding video and the AVM video may be displayed in different regions of one display unit and the present invention is not limited thereto.

The display module 210 will be described below in detail with reference FIG. 5.

The camera module 220 may include a front camera 222, first and second side cameras 224 and 226, and a rear camera 228, In an exemplary embodiment, when a gear of the vehicle is positioned at an "R" step or a speed of the vehicle is lowered to a setting speed, the camera module 220 automatically captures a surrounding video of the vehicle or operates in response to the control of the control module 240 to capture the surrounding video of the vehicle, but the present invention is not limited thereto.

The front camera 222 may capture a front side video of the vehicle among the surrounding videos and the first and second side cameras 224 and 226 capture first and second side videos of the vehicle among the surrounding videos.

In this case, the first and second side cameras 224 and 226 may capture a left side and a right side of the vehicle.

The rear camera 228 may capture a rear side video of the vehicle, among the surrounding videos.

In the exemplary embodiment, even though it has been described and illustrated in the drawing that the four cameras 222, 224, 226, and 228 transmit the captured front side video, first and second side videos, and rear side video to the control module 240, a camera control unit (not illustrated) which combines the front side video, the first and second side videos, and the rear side video which are captured by the four cameras 222, 224, 226, and 228 to generate a surrounding video and transmit the surrounding video to the control module 240 may be provided and the present invention is specifically limited thereto.

The lamp driving module 230 supplies or shuts off a driving power to first and second head lamps (not illustrated) which are mounted in the vehicle to turn on or off the first and second head lamps.

Here, the lamp driving module 230 may supply or shut off the driving power to the first and second head lamps in accordance with the control of the control module 240 or supply or shut off the driving power in accordance with an on-command or an off-command of the first and second head lamps which are input from the outside, but the present invention is not limited thereto.

The control module 240 may include a video processing unit 242, a first brightness determining unit 243, a brightness comparing unit 244, a second brightness determining unit 246, and a control unit 248.

The video processing unit 242 may compose the front side video, the first and second side videos, and the rear side video which are input from the camera module 220 in accordance with a set video composite condition to form the AVM video and calculate a first illumination brightness corresponding to a first illumination region of the first head lamp and a first shadow brightness corresponding to a first shadow region and a second illumination brightness corresponding to a second illumination region of the second head lamp and a second shadow brightness corresponding to a second shadow region, in the AVM video.

That is, the video processing unit 242 may calculate the first and second illumination brightnesses corresponding to pixels included in the first and second illumination regions and the first and second shadow brightnesses corresponding to pixels included in the first and second shadow regions.

That is, the pixel may have Y, Cr, and Cb values in order to express the video and the Y value is a brightness and may have a value between 0 and 255.

That is, the video processing unit 242 may calculate the first and second illumination brightnesses and the first and second shadow brightnesses based on the Y value corresponding to at least one pixel which is included in each of the first and second illumination regions and the first and second shadow regions of each of the first and second head lamps, in the AVM video.

The above-mentioned first and second illumination regions and first and second shadow regions may correspond to predetermined regions in the AVM video or may be distinguished as videos whose brightness is different from that of a background video, but the present invention is not limited thereto.

Therefore, the video processing unit 242 calculates the first and second illumination brightnesses based on the brightnesses of the pixels included in the first and second illumination regions and the first and second shadow brightnesses based on the brightnesses of the pixels included in the first and second shadow regions.

The first brightness determining unit 243 may determine whether an illumination brightness difference between the first and second illumination brightnesses falls into a set brightness difference range.

The illumination brightness difference is a brightness to check whether an obstacle is present in front of any one of the first and second head lamps and when the obstacle is present in front of any one of the first and second head lamps, the first and second head lamps may have different brightnesses, so that an error may occur when it is determined whether the first and second head lamps normally operate.

When the illumination brightness difference falls into the brightness difference range, the brightness comparing unit 244 compares a lower shadow brightness of the first and second shadow brightnesses which are calculated by the video processing unit 242 with the set reference brightness.

That is, the brightness comparing unit 244 may output a first signal when the lower shadow brightness of the first and second shadow brightnesses is smaller than the reference brightness, and output a second signal when the lower shadow brightness of the first and second shadow brightnesses is larger than the reference brightness.

The reference brightness is a brightness which is set to check whether the vehicle is located in a bright place or a dark place.

The reference brightness may be a value which is used to check whether the lower shadow brightness of the first and second shadow brightnesses is a valuable value in order to check whether a turned-on state of the first and second head lamps is maintained and may be a brightness which is set corresponding to an external brightness to distinguish the first and second illumination brightnesses and the first and second shadow brightnesses.

When the first signal is input from the brightness comparing unit 244, the second brightness determining unit 246 may calculate a brightness difference between any one of the first and second illumination brightnesses and the lower shadow brightness of the first and second shadow brightnesses and determine whether the brightness difference falls into the reference brightness difference range.

When the brightness difference falls into the brightness difference range, the control unit 248 may generate state information of the first and second head lamps indicating that the first and second head lamps normally operate and when the brightness difference does not fall into the brightness difference range, generate state information of the first and second head lamps indicating that the first and second head lamps erroneously operate and control the display module 210 to display the state information.

When the second signal is input from the brightness comparing unit 244, the control unit 248 may control the display module 210 to display movement information indicating that the vehicle moves.

That is, when the second signal is input, the control unit 248 determines that the vehicle is located in the bright place. Therefore, when the first and second head lamps are in an on-state, the control unit 248 cannot check whether the first and second head lamps normally operate so that the control unit 248 generates the movement information which requests the vehicle to move to the dark place and transmits the movement information to the display module 210.

Figure 5:
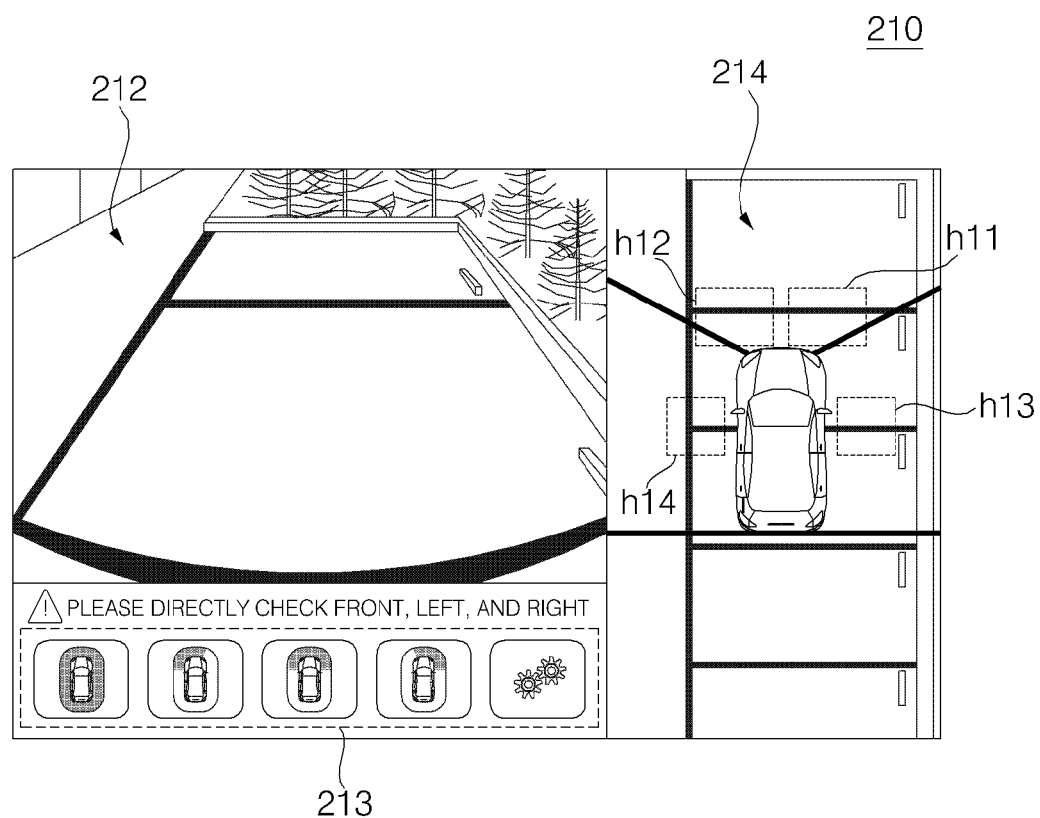
FIG. 5 is a view illustrating an example of an AVM video which is displayed on a display module illustrated in FIG. 4.

FIG. 5 is a view illustrating an example of an AVM video which is displayed on a display module illustrated in FIG. 4.

FIG. 5 is an example explaining the display module 210 and the present invention is not limited thereto.

Referring to FIG. 5, the display module 110 may include a first display unit 212 and a second display unit 214 as illustrated in FIG. 4.

In this case, an input menu 213 through which a display command to display any one of the front side video, the first and second side videos, and the rear side video which are captured by the camera module 220 is input may be displayed on the first display unit 212.

An AVM video which is obtained by erasing at least a part of the front side video, the first and second side videos, and the rear side video and composing the other parts may be displayed on the second display unit 214. In this case, the second display unit 214 may include a front side of the vehicle, that is, first and second illumination regions h11 and h12 where the first and second head lamps (not illustrated) illuminate and first and second sides of the vehicle, that is, first and second shadow regions h13 and h14 which are not influenced by the state when the first and second head lamps are turned on.

Here, the first illumination regions h11 and h12 and the first and second shadow regions h13 and h14 are regions to determine whether the first and second head lamps normally operate.

That is, the control module 240 may determine whether the first head lamp normally operates based on the first illumination brightness which is calculated in the first illumination region h11 and the first shadow brightness which is calculated in the first shadow region h13.

The control module 240 may determine whether the first head lamp normally operates based on the second illumination brightness which is calculated in the second illumination region h12 and the second shadow brightness which is calculated in the second shadow region h14.

As described above, the control module 240 may determine whether any one of the first and second head lamps normally operates or an obstacle is present based on the result obtained by comparing the first and second illumination brightnesses and determine whether the first and second head lamps normally operate by comparing the lower brightness of the first and second shadow brightnesses and the first and second illumination brightnesses, but the present invention is not limited thereto.

The word "comprise", "configure", or "have" used in the above description will be understood to imply the inclusion of stated elements unless explicitly described to the contrary, so that the word will be interpreted to imply the inclusion of stated elements but not the exclusion of any other elements.

Preferred embodiments of the present invention have been illustrated and described above, but the present invention is not limited to the above-described specific embodiments, it is obvious that various modifications may be made by those skilled in the art, to which the present invention pertains without departing from the gist of the present invention, which is claimed in the claims, and such modifications should not be individually understood from the technical spirit or prospect of the present invention.

What is claimed is:

1. An AVM system, comprising:
   a display module;
   a camera module which captures surrounding videos of a vehicle;
   a lamp driving module which supplies or shuts off a driving power to first and second head lamps which are mounted in the vehicle to turn on or off the first and second head lamps; and
   a control module which calculates a first illumination brightness corresponding to a first illumination region of the first head lamp and a first shadow brightness corresponding to a first shadow region, in an AVM video obtained by composing the surrounding videos and a second illumination brightness corresponding to a second illumination region of the second head lamp and a second shadow brightness corresponding to a second shadow region, generates first state information of the first head lamp and second state information of the second head lamp based on the first and second illumination brightnesses and the first and second shadow brightnesses, and controls the display module to display the AVM video and the first and second state information.

2. The AVM system of claim 1, wherein the lamp driving module supplies or shuts off the driving power to the first and second head lamps in accordance with the control of the control module.

3. The AVM system of claim 1, wherein the surrounding videos include the front side video, the first and second side videos, and the rear side video of the vehicle and
   the control module includes:
   a video processing unit which composes the front side video, the first and second side videos, and the rear side video in accordance with a set video composite condition to form an AVM video and calculates the first and second illumination brightnesses corresponding to a pixel which is included in the first and second illumination regions and the first and second shadow brightnesses corresponding to a pixel included in first and second shadow regions, in the AVM video;
   a first brightness determining unit which determines whether an illumination brightness difference between the first and second illumination brightnesses falls into a set brightness difference range;
   a brightness comparing unit which outputs a first signal when a lower shadow brightness of the first and second shadow brightnesses is smaller than a set reference brightness when the illumination brightness difference falls into the brightness difference range and outputs a second signal when the lower shadow brightness is larger than the reference brightness;
   a second brightness determining unit which determines whether a brightness difference between any one of the first and second illumination brightnesses and the shadow brightness falls into the set reference brightness difference range when the first signal is input; and
   a control unit which, when the brightness difference falls into the brightness difference range, generates the first and second state information indicating that the first and second head lamps normally operate and when the brightness difference does not fall into the brightness difference range, generates the first and second state information indicating that any one of the first and second head lamps erroneously operates to control the display module to display the first and second state information.

4. The AVM system of claim 3, wherein when the illumination brightness difference between the first and second illumination brightnesses does not fall into the set brightness difference range, the control unit determines that an obstacle is present in front of any one of the first and second head lamps to control the display module to display obstacle information.

5. The AVM system of claim 3, wherein the control unit controls the display module to display movement information indicating that the vehicle moves when the second signal is input.

* * * * *